United States Patent [19]

Page

[11] Patent Number: 4,665,711
[45] Date of Patent: May 19, 1987

[54] HEAT PUMP SYSTEMS

[75] Inventor: John K. R. Page, Little Sandhurst, England

[73] Assignee: IC Gas International Ltd., London, England

[21] Appl. No.: 826,217

[22] Filed: Feb. 5, 1986

[30] Foreign Application Priority Data

Feb. 8, 1985 [GB] United Kingdom ............... 8503287

[51] Int. Cl.$^4$ ............................................. F25B 27/00
[52] U.S. Cl. ..................................... 62/238.3; 62/476
[58] Field of Search ................ 165/62; 62/238.3, 476; 237/2 B

[56] References Cited

U.S. PATENT DOCUMENTS

| 3,254,507 | 6/1966 | Whitlow | 62/476 |
|---|---|---|---|
| 4,207,751 | 6/1980 | Kampfenkel et al. | 62/238.3 X |
| 4,501,127 | 2/1985 | Sommers et al. | 62/476 X |
| 4,548,048 | 10/1985 | Reimann et al. | 62/238.3 |

FOREIGN PATENT DOCUMENTS 0036981 10/1981 European Pat. Off. .
0046196 9/1984 European Pat. Off. .
2107444 10/1981 United Kingdom .

Primary Examiner—Lloyd L. King
Attorney, Agent, or Firm—Wood, Dalton, Phillips Mason & Rowe

[57] ABSTRACT

The present invention relates to an improved heat pump system of a heating system which also comprises a utilization circuit. The heat pump system comprises a generator, an absorber, a condenser and an evaporator, and the utilization circuit for circulation of a heat carrier medium comprises heat exchanger means for removing thermal energy from the heat pump system. To supplement the thermal output of the heat pump system, when the utilization circuit requires a greater thermal output than can efficiently be achieved by the heat pump system alone, a supplementary condenser is provided in the generator, the condenser comprising a heat exchanger in heat exchange with vapor in the generator which is connected in the utilization circuit by operation of a valve when additional thermal energy is required. Opening of the valve occurs simultaneously with an increase in the energy provided to the generator.

5 Claims, 5 Drawing Figures

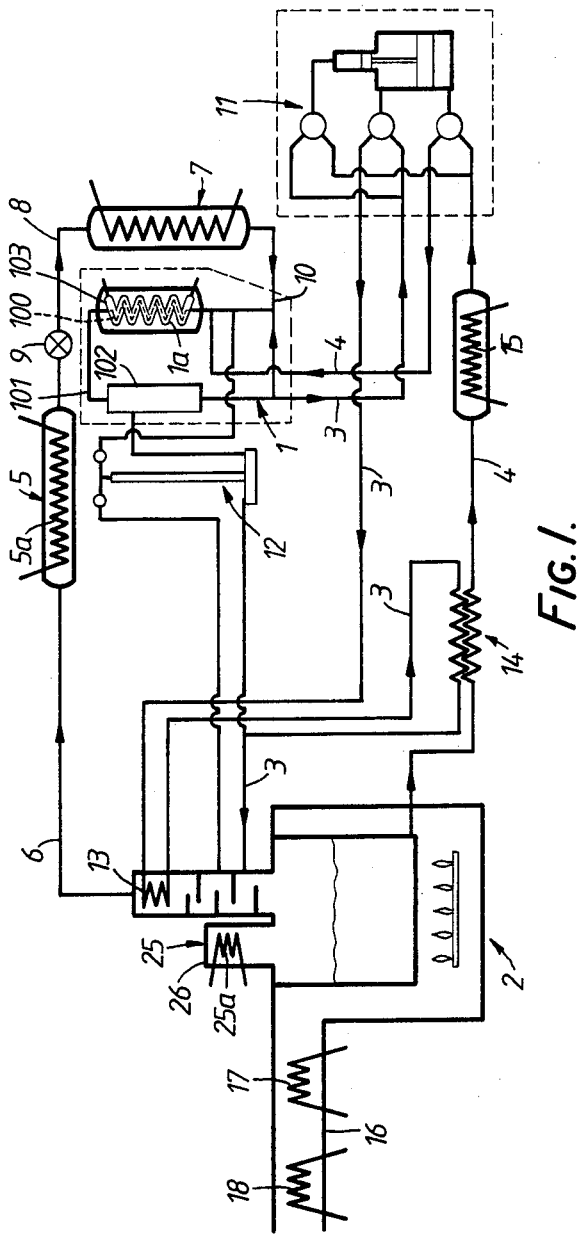
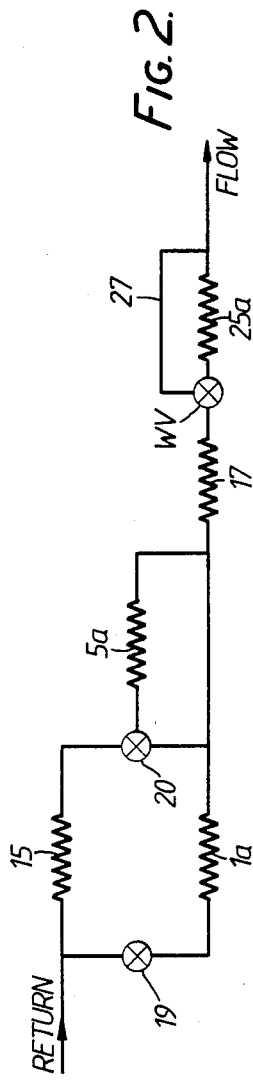
FIG. 1.
FIG. 2.

HEAT PUMP SYSTEMS

The present invention relates to improvements in and relating to absorption heat pump heating systems, for example for providing the heat source of a domestic hot water and/or central heating system.

Absorption heat pump systems conventionally comprise an absorber in which the refrigerant, for example ammonia, is absorbed in an absorbent, for example water, a generator to which the absorbent with absorbed refrigerant is pumped at an increased pressure and in which the refrigerant is driven out of the absorbent, the absorbent being returned to the absorber via pressure reducing means, a condenser to which the refrigerant from the generator is supplied and in which it cools and condenses, and an evaporator to which the condensed refrigerant is supplied via an expansion valve. Heat is supplied to the generator and evaporator, and the condenser and absorber are both associated with heat exchange means connected in a utilization circuit, for example the hot water and/or central heating system.

It is found that, with such absorption heat pump system, in maximising the efficiency of the system in relation to the cost of the installation, the maximum power and output temperature achievable are relatively low, for example of the order 8 kW at 55° C. While these levels are acceptable for the central heating and hot water systems in modern so-called low energy housing, they are not sufficient for the central heating and hot water systems in older or larger housing and particularly in colder weather conditions.

According to the present invention there is provided a heating system comprising an absorption heat pump system and a utilization circuit, the heat pump system comprising a generator, an absorber, a condenser and an evaporator, the utilization circuit for circulation of a heat carrier medium comprising heat exchanger means for removing thermal energy from the heat pump system, wherein the generator is associated with a supplementary condenser separate from the heat pump system, located in a region of the generator subjectable to vapour produced by the generator and comprising a supplementary heat exchanger connectable in the utilization circuit, and control means are provided for controlling the connection of the supplementary heat exchanger in the utilization circuit.

The heat exchanger means of the utilization circuit may comprise first and second heat exchangers associated with the absorber and condenser for withdrawing thermal energy therefrom and the supplementary heat exchanger may be connectable in series with the first and second heat exchangers.

The supplementary heat exchanger may be connected in parallel with a by-pass line and the control means may include a valve for controlling flow of the heat carrier medium through the by-pass line or through the supplementary heat exchanger.

The control means may include means controlling the supply of energy to the generator to increase the supply of energy thereto with operation of the valve to permit heat carrier medium to flow through the supplementary heat exchanger.

The absorption heat pump system may include a pump for pumping liquid from the absorber to the generator, the pump being driven by fluid from the generator which is then passed to the absorber. The fluid may comprise liquid and/or vapour from the generator.

Embodiments according to the invention will now be described, by way of example only, with reference to the accompanying drawings.

In the drawings:

FIG. 1 illustrates diagrammatically an embodiment of an absorption heat pump system and part of a utilization circuit of a heating system according to the present invention;

FIG. 2 illustrates diagrammatically part of the utilization circuit of the heating system of FIG. 1;

Figure 3:
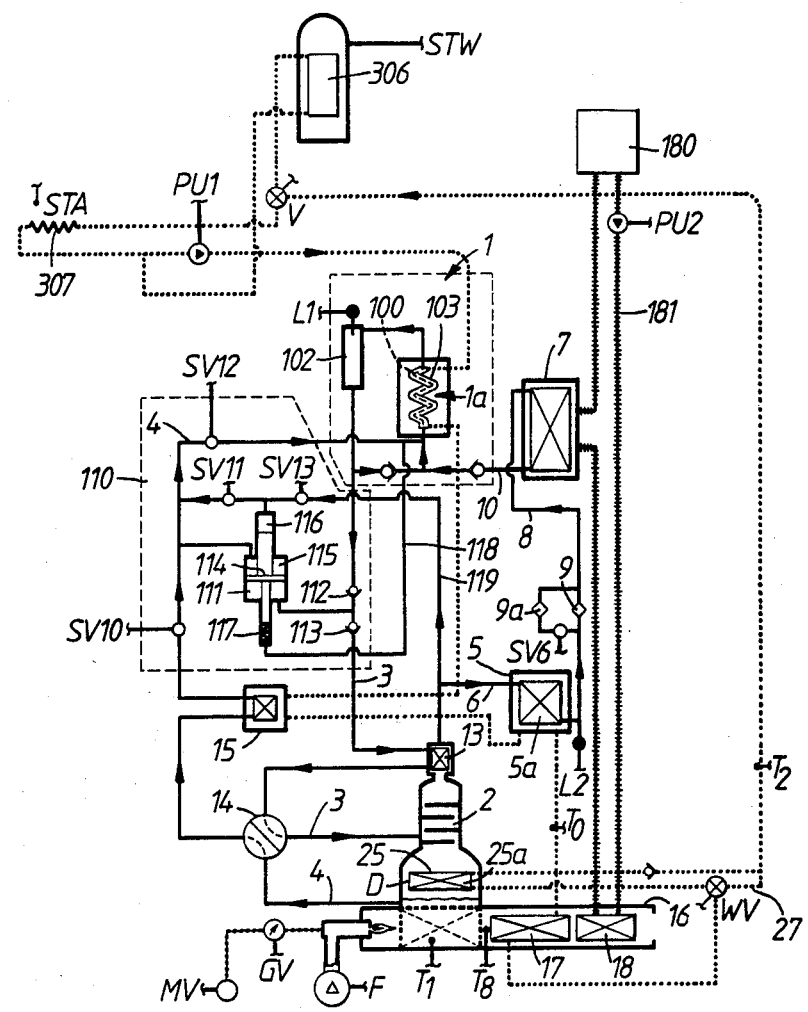
FIG. 3 illustrates diagrammatically another embodiment of a heating system according to the present invention.
Figure 3:
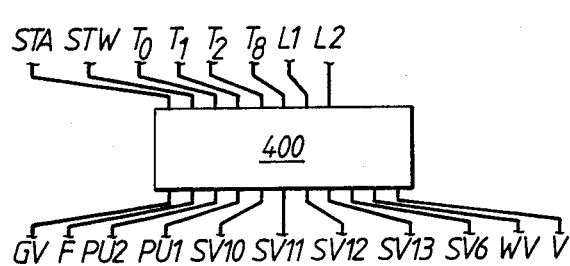

The heating system shown in FIGS. 1 and 2 comprises a heat pump system shown in FIG. 1 with a utilization circuit, parts of which are shown in FIG. 1 and which are also shown in FIG. 2. The heat pump system shown in FIG. 1 comprises an absorber 1 in which a refrigerant, e.g. ammonia, is absorbed in an absorbent, e.g. water, and which includes a heat exchanger 1a, a generator 2 to which the absorbent with absorbed refrigerant (called the strong solution) is supplied via a line 3 by a solution pump at an increased pressure, and in which the strong solution is heated to drive off the refrigerant, the absorbant depleted of refrigerant (called the weak solution) from the generator being returned via a line 4 and pressure reducing means to the absorber 1, a condenser 5 to which the refrigerant from the generator is supplied at high pressure via a line 6 and in which it condenses on heat exchanger 5a, and an evaporator 7 to which the condensed refrigerant is supplied via line 8 provided with an expansion valve 9, in which the refrigerant evaporates and from which the evaporated refrigerant is supplied via a line 10 to the absorber.

The absorber 1 may be a conventional absorber or, as shown, it may be as described in U.K. Patent Application No. 8526579. Such an absorber comprises a generally upwardly extending passage 100 through which liquid flows upwardly and a return path 101 including a reservoir 102. Weak liquid from the generator is supplied to the lower end of passage 100 together with refrigerant from the evaporator. The refrigerant is absorbed in the weak solution as it flows upwardly through passage 100 and at the same time causes circulation of the liquid, independently of the flow caused by the solution pump, upwardly through passage 100 and strong solution is withdrawn from the reservoir 102 for the generator. Passage 100 is surrounded by a jacket 103 providing heat exchanger 1a and through which the heat carrier medium of the utilization circuit flows counter-current to flow of liquid in passage 100 and to cool the liquid as absorption proceeds.

The pump and pressure reducing means in lines 3 and 4 between the absorber 1 and generator 2 for the strong and weak solutions may be conventional or may, as shown be provided by a pump 11 as described in British Pat. No. 2086026. The pump 11 is, as described, generally operated to pump excess of the weak solution which is then accommodated in a lock vessel 12 and returned to the generator 2 by gravity flow.

The strong solution from the absorber 1 may, as shown, be utilised in the rectification of the refrigerant vapour and may thus be pre-heated before entering the generator by heat exchange in dephlegmator or rectifying heat exchanger 13 with the refrigerant vapour as it leaves the generator 2, and then by heat exchange in heat exchanger 14 with the weak solution leaving the generator 2. The weak solution may be additionally cooled in a further heat exchanger 15 which is in heat exchange relation with the heat carrier medium of the utilization circuit.

The heat input for the generator 2 is derived from any suitable means such as oil burners or electrical heaters but the generator is preferably, as shown, gas powererd. When gas powered the generator may operate as a fully condensing boiler and to this end is provided with a flue 16 with two heat exchangers 17, 18. The first heat exchanger 17 is connected in the utilization circuit as shown in FIG. 2 and the second heat exchanger 18 is connected as part of the heat input to the evaporator 7. Evaporator 7 may also, as is conventional, have an external low grade energy source, heat carrier medium, which may be air or water or other suitable fluid, being pumped through a heat exchanger at the low grade energy source and heat exchanger 18 to a heat exchanger in the evaporator 7. Heat exchanger 17 and 18 are advantageously of sufficient size to be capable of recovering energy efficiently in the flue 16.

The utilization circuit of the above described heat pump system comprises the heat exchangers 1a, 5a, 15 and 17 which may for example be connected as shown in FIG. 2 with valves 19 and 20 provided to control the relative flows of the heat carrier medium, for example water, through the heat exchangers 1a, 15 and 5a both during start up of the heating system and during normal operation. During normal operation, valves 19 and 20 are operated so that the heat carrier medium flows in parallel through heat exchangers 15 and 5a of the condenser and heat exchanger 1a of the absorber, the relative flows being adjusted by valve 19, and all the fluid then flows through heat exchanger 17. For a domestic hot water and/or central heating system, the heat exchangers are connected to a heat exchanger in a hot water tank and/or the radiators of the central heating system.

The heat pump system as described above may, for example, be designed to have a maximum output of 8 kW at 55° C. with the power supplied to the generator being approximately 6 kW.

To increase the maximum output power and temperature, the generator is modified by the association with it of a supplementary condenser 25 which is arranged in a region of the generator subjectable to the refrigerant vapor in the generator, but which does not form part of the heat pump system. As shown the condenser 25 comprises a heat exchanger 25a which is connectable in the utilization circuit and is located in the vapour space of the generator. The heat exchanger 25a may, as shown in FIG. 1, be provided in a housing 26 projecting from the top of the generator, which would enable the condenser 25 to be isolated from the generator vapour space when the heat exchanger 25a is not in use, for example by a retractable flap closing the lower end of the housing 26, or it may be permanently exposed to the vapour in the generator.

As shown in FIG. 2, the heat exchanger 25 is connected in the utilization circuit in parallel with a by-pass line 27 and valve WV so that by operation of valve WV the heat exchanger 25a can be isolated from the utilization circuit or connected in the utilization circuit. It will be appreciated that, when the heat exchanger 25a is isolated from the utilization circuit, the condenser 25 will cease to operate as such and will not withdraw thermal energy from the generator.

In use of the above described heating system, when the requirements of the utilization circuit are at or below the maximum of the heat pump system, operating as a heat pump system, heat exchanger 25a is isolated from the utilization circuit. When more heat is required, valve WV will be opened, the condenser 25 will operate and simultaneously the power supplied to the generator is progressively increased, depending on the requirements of the utilization circuit. Initially the heat pump system will continue to operate as a heat pump system, with the output of the heat pump system being supplemented by the output of the heat exchanger 25a. However, as the temperature of the heat carrier medium in the utilization circuit rises and specifically as the temperature of the medium flowing through the heat exchangers in the absorber and condenser rises, there will come a point, which depends on the operating conditions of the heat pump system, when the evaporator and condenser will cease to function and the efficiency of the system will then become equivalent to that of a conventional boiler system.

Until such time as heat exchanger 25a is brought into the utilization circuit, the coefficient of performance of the system will be that of the heat pump system in the absence of the supplementary condenser 25. When the heat exchanger 25a is brought into the utilization circuit, the coefficient of performance of the entire system will be reduced.

The heating system shown in FIG. 3 is similar to that of FIGS. 1 and 2 but has different connections of the various heat exchangers in the utilization circuit and a different form of pump 111 replacing pump 11 in the embodiment of FIG. 1. The same reference numbers are used in the embodiment of FIG. 3 for the same parts used in the embodiments of FIGS. 1 and 2.

The pump 110 used in the embodiment of FIG. 3 comprises a pumping chamber 111 to which strong liquid from the absorber is supplied via one-way valve 112 and from which it is pumped via one-way valve 113 to the generator via line 3, the dephlegmator 13 and heat exchanger 14 as in the previous embodiment. Chamber 111 is defined by a piston 114 providing a first driving chamber 115 and a second chamber 116. The driving fluid for the pump is mainly weak solution flowing at high pressure from the generator to the absorber along line 4 which is supplied to chambers 115 and 116 via a solenoid operated valve SV10 and flows therefrom to the absorber via a solenoid operated valve SV12, valves SV10 and SV12 being operated alternately, valve SV11 being, under these circumstances permanently open and valve SV13 permanently closed. The return force on the piston 114 is, as shown, provided by a spring 117 and a bias provided by connecting the chamber housing the spring permanently to line 4 downstream of the pump so that it receives low pressure liquid. The process of absorption increases the specific volume of the strong solution compared to that of the weak solution by an amount which depends on the respective concentrations of refrigerant in the respective solutions. Thus the average volume flow rate of solution from the absorber to the generator will be greater than that from the generator to the absorber. The effective areas of the chambers in the pump 110 are arranged so that there is an imbalance in the volume of liquid flowing to and from the generator, less liquid being pumped to the generator than flows back to the absorber. Thus in time the level of liquid in the absorber will rise above a predetermined level, sensed by a liquid level sensor in the reservoir 102 of the absorber. When this occurs supply of liquid to chamber 116 of the pump is replacd by supply of vapor from the generator and for this purpose the vapour space of the generator is connected by a line 119 and the solenoid operated valve SV13 to the chamber 116. When the level of liquid in reservoir 102 rises above the preset level, valve SV13 is operated with valve SV10 to open and close with valve SV10 and valve SV11 is operated with valve SV12 to open and close with that valve so that during the pumping phase of the pump, liquid from the generator is supplied to chamber 115 and vapour is supplied to chamber 116 and during the return phase both the liquid and vapour are supplied together to the absorber. When the level of liquid in the absorber falls below a preset level, valve SV13 is again permanently closed and valve SV11 is permanently open to resume operating in the mode when both chambers 115 and 116 are supplied with liquid from the generator.

As in the preceding embodiment, the evaporator 7 is provided with heat from heat exchanger 18 in the generator flue and a heat exchanger 180 subject to a low grade energy source, for example an external source, heat from heat exchangers 18 and 180 being supplied to a heat exchanger in the evaporator through a circuit 181 through which a heat carrier medium is pumped by pump PU2.

To control relative operation of the evaporator and the condenser over a range of performance, an additional expansion valve 9a together with a solenoid operated valve SV6 is connected in parallel with expansion valve 9, valve SV6 being operated in dependence on the level of liquid in the condenser which is sensed by level sensor 12.

In this embodiment, the heat exchangers 1a, 15 and 5a are connected in series in the utilization circuit and, as in the previous embodiment, in series with the heat exchanger 25 which is arranged in parallel with a by-pass line 27 and under the control of a solenoid operated valve WV. It will be appreciated that the interconnection between heat exchangers 1a, 15 and 5a depends on the requirements of the utilization circuit and the connections shown in this embodiment and in the embodiment of FIGS. 1 and 2 are shown by way of example only.

As shown, the utilization circuit includes a pump PU1 for circulating the heat carrier medium at a constant rate, together with a solenoid valve V for controlling supply of the heat carrying medium to a heat exchanger in a hot water tank 306 alone or to both the tank and to radiators shown diagrammatically at 307 of a central heating system or to the radiators 307 alone.

Control means 400 for the heating system is provided which includes controls for the heat pump system for controlling solenoid operated valves SV10, SV11, SV12, SV13 and SV6 in dependence on the level sensed by level sensor L1 and L2 and for controlling the thermal output of the system by control of the air and gas supplied to the boiler in dependence on the temperatures in the hot water tank, in the ambient air in the region of the central heating radiators, in the heat carrier medium flowing in the utilization circuit, in the boiler and in the generator flue, which are sensed by temperature sensors STW, STA, T0, T2, T1 and T8, the temperature sensors STW and STA for sensing the temperatures in the hot water tank and ambient air being thermostatic. It will be appreciated that the controls described above for the embodiment of FIG. 3 can similarly be applied to the embodiment of FIGS. 1 and 2.

When the thermal output required of the heating system exceeds that which can be provided by the heat pump system operating as a heat pump system, control 400 causes opening of valve WV to bring the heat exchanger 25a into the utilization circuit together with the progressive increase in energy supplied to the boiler, i.e. the progressive opening of gas valve GV and increase in speed of air supply fan F, until the required thermal output is achieved. As with the system of FIGS. 1 and 2, if the thermal output required is sufficiently high, the temperature of the heat carrier medium of the utilization circuit flowing through the heat exchangers in the absorber and condenser will rise to a temperature at which the absorber and condenser cease to operate as such. The heat pump system then converts to a conventional boiler system. For a heat pump system which is designed to operate with a high pressure in the generator of the order of 350 psi and an evaporator temperature of the order of 0° C., the temperature of the heat carrier medium leaving the heat exchanger 25a, i.e. that sensed by temperature sensor T2, at which this will occur is about 60° C.

Figure 4:
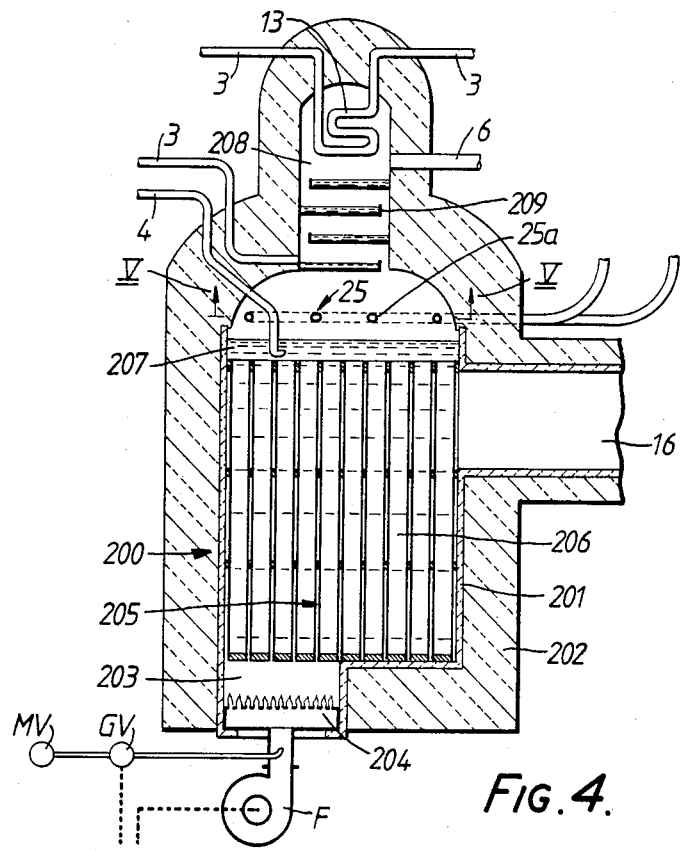
FIG. 4 is a section through a generator of the heating system of FIG. 3.
Figure 5:
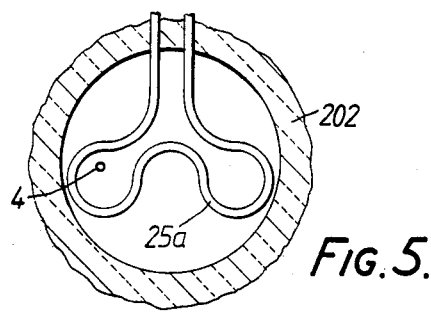
FIG. 5 is a section on the line V—V of FIG. 4.

The generator of the heating system of FIG. 3 is shown more fully in FIGS. 4 and 5. The generator comprises a main body 200 provided in its lower region with a high temperature lining 201 and surrounded by thermal insulation 202. The body 200 provides a lower chamber 203 housing gas burners 204 to which gas is supplied via valve GV and air by fan F. Gases from the burners 204 rise into a heat exchange region 205, circulate in that region and exit through flue 16. In the heat exchange region 205, an array of tubes 206 is provided, the tubes being closed at their lower ends and open at their upper ends which communicate with the liquid space 207 in the body 200 to which strong liquid is supplied by line 3. The weak liquid exits from the generator along line 4 which opens into the liquid space 207 above the level of the tubes 205.

The lower region of the body is generally cylindrical and the upper region providing the vapour space 208 is of reducing and reduced section. Vapour is withdrawn from the vapour space along line 6 connected to an upper part of the vapour space, the vapour having passed through a rectifying portion, as is conventional, comprising rectifier trays 209. The rectifying heat exchanger 13 is provided at the upper end of the vapour space and the supplementary condenser 25 with its heat exchanger 25a is provided in the space above the level of the liquid in the generator and below the rectifier trays 209. As shown in FIG. 5, the heat exchanger 25a is in the form of a pipe having a length which is determined by the maximum thermal output required of the supplementary condenser 25. As shown, to minimise the vertical extent of the generator, the heat exchanger 25a is in the form of a sinuous planar coil but it may alternatively have a plurality of coils extending upwardly within the vapour space of the generator.

In the above described embodiments, the heat pump system is intended to operate using ammonia as the refrigerant and water as the absorbent but it will be appreciated that the invention is equally applicable to heat pump systems using other refrigerants and absorbents.

There is thus provided a heating system comprising a heat pump system which can be arranged to operate as a heat pump system for the majority of the time at maximum efficiency but, in which, when the requirements on the thermal output of the system exceed a preset level, the thermal output of the heat pump system can be supplemented and it is only at the upper end of the range of operation of the system that the heat pump system may cease to operate as such and convert to a conventional boiler system.

What is claimed is:

1. A heating system comprising an absorption heat pump system and a utilization circuit, said heat pump system comprising a generator, an absorber, a condenser and an evaporator, said utilization circuit for circulation of a heat carrier medium comprising heat exchanger means for removing thermal energy from said heat pump system, wherein said generator comprises a liquid space for liquid to be heated thereby and a vapour space for vapour above said liquid space, said generator being associated with a supplementary condenser separate from said heat pump system, located in a region of said generator subjectable to said vapour produced by said generator, and comprising a supplementary heat exchanger subjectable to said vapour produced by said generator and connectable in said utilization circuit, and control means are provided for controlling connection of said supplementary heat exchanger in said utilization circuit.

2. A heating system as claimed in claim 1, wherein said vapour space contains rectifying means and wherein said supplementary heat exchanger is located in said vapour space below said rectifying means.

3. A heating system as claimed in claim 1, wherein said utilization circuit comprises first and second heat exchangers associated with said absorber and with said condenser for withdrawing thermal energy therefrom and said supplementary heat exchanger is connectable in said utilization circuit in series with said first and second heat exchangers.

4. A heating system as claimed in claim 1, wherein said supplementary heat exchanger is connected in said utilization circuit in parallel with a by-pass line and said control means include a valve for controlling flow of the heat carrier medium through said by-pass line or through said supplementary heat exchanger.

5. A heating system as claimed in claim 1, wherein said control means include means for controlling the supply of energy to said generator to increase the supply of energy thereto on operation of said control means causing connection of said supplementary heat exchanger in said utilization circuit.

* * * * *